United States Patent [11] 3,533,495

[72] Inventor Charles H. Wallace
Sylvania, Ohio
[21] Appl. No. 752,575
[22] Filed Aug. 14, 1968
[45] Patented Oct. 13, 1970
[73] Assignee Schmidt-Wallace, Inc.
Toledo, Ohio
a corporation of Ohio

[54] APPARATUS FOR HANDLING WIENERS AND THE LIKE
6 Claims, 11 Drawing Figs.
[52] U.S. Cl. .................................................... 198/20,
198/102, 198/177, 226/104, 226/170
[51] Int. Cl. ....................................................... B65g 47/52
[50] Field of Search ........................................... 226/104,
105, 107; 198/177, 28; 99/261, 262, 443

[56] References Cited
UNITED STATES PATENTS
3,422,950    1/1959    Bachmann.................... 198/177

Primary Examiner—Evon C. Blunk
Assistant Examiner—Alfred N. Goodman
Attorney—Allen D. Gutchess, Jr.

ABSTRACT: Apparatus for receiving wiener sections from a high-speed wiener-forming machine and for further processing the wiener sections is disclosed. An elongate wiener-supporting rod is aligned with the path of wiener hooks which carry looped festoons of the wiener sections onto the elongate supporting rod, after which the rod is moved away from the hooks to strip the wieners therefrom. Subsequently, the rod carries the wiener sections through an oven in which they are suitably processed. A stripping device subsequently pushes and carries the wiener sections off of the rod, at which time they are peeled and packaged.

Patented Oct. 13, 1970
3,533,495
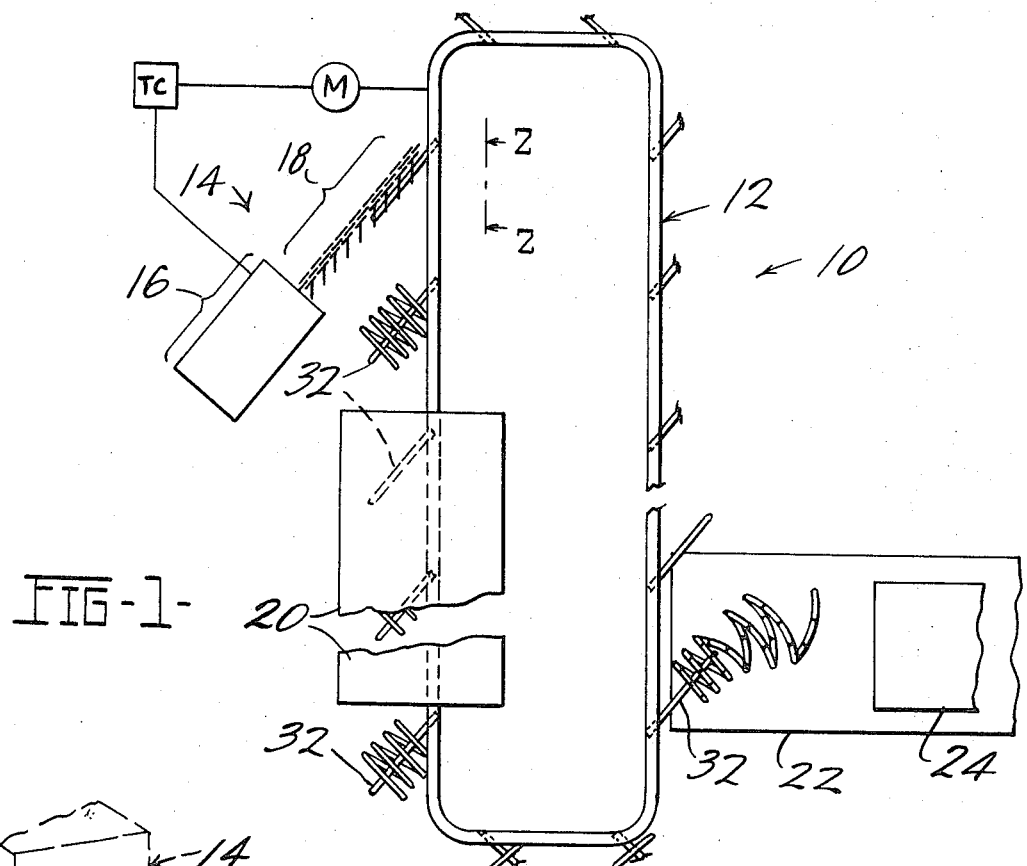
FIG-1-
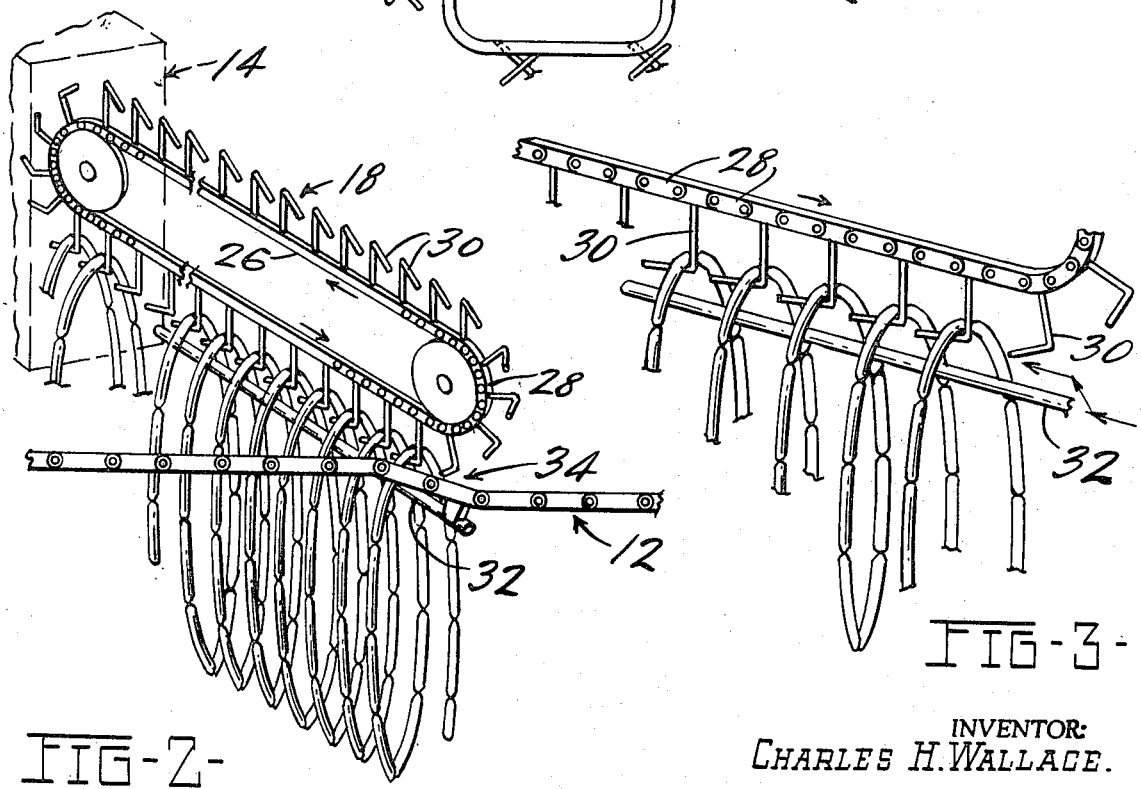
FIG-2-
FIG-3-
INVENTOR:
CHARLES H. WALLACE.
BY
Owen & Owen
ATT'YS.

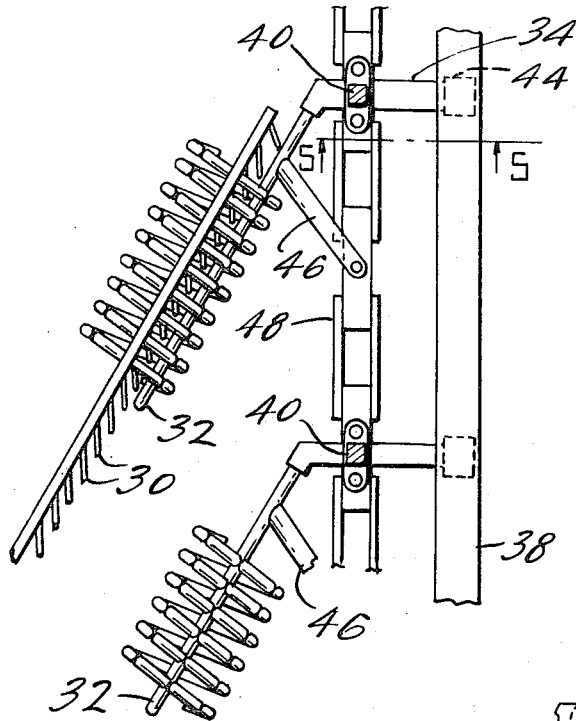
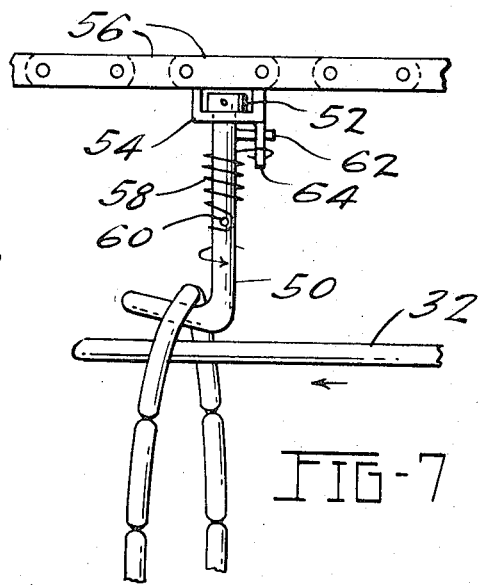
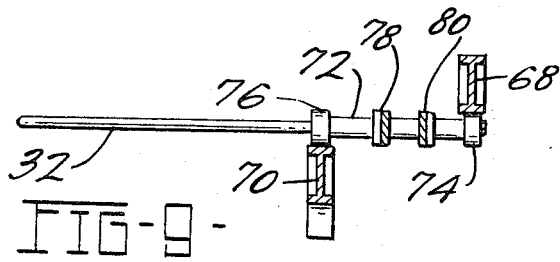
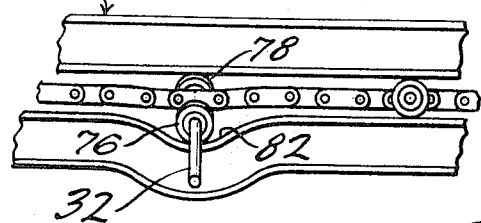
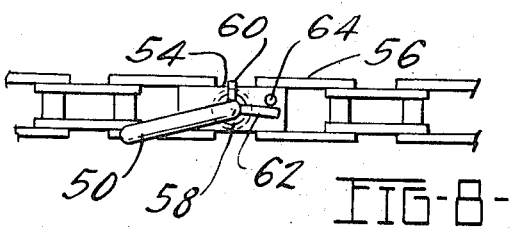
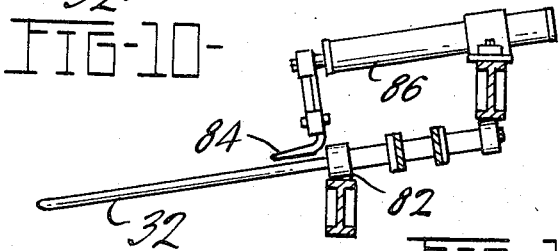

APPARATUS FOR HANDLING WIENERS AND THE LIKE

The present invention relates to apparatus for handling wiener sections and specifically to apparatus for receiving the wiener sections from a high-speed wiener-forming machine and for subsequently processing the wiener sections.

The preparation of wieners is becoming more and more automated with continuous conveyor lines now commonly replacing the batch-type smokehouse process. For certain types of production lines, the wieners can be effectively loaded onto a continuous conveyor and unloaded therefrom by the apparatus shown in U.S. Pat. No. 3,204,844 issued to Charles H. Wallace. With certain types of high-speed wiener-forming machines, however, the aforesaid apparatus is not as effective as is desirable. In order for the loading apparatus to be used with high-speed wiener-forming machines, the wieners from the high-speed machine are collected into piles by an operator with other operators subsequently feeding the linked wiener sections into the above loading apparatus for the conveyor. While this is satisfactory from the operating standpoint, a number of workers could otherwise be eliminated if the high-speed wiener-forming machine could load the wiener sections directly on the continuous conveyor of the production line.

The present invention provides means for receiving the formed wiener sections from a high-speed wiener-forming machine, for subsequently carrying the wiener sections through an oven, and for subsequently unloading the wiener sections for peeling and packaging. A wiener-forming machine of the type to which the invention relates ejects the connected wiener sections in a generally spiral path where they are collected in festoons on hooks of an endless conveyor and carried in a substantially lineal path away from the machine. As is known in the art, the wiener sections are formed in 84-foot lengths which is the length of the standard plastic tube which forms the temporary skin or casing for the wieners while they are being processed. After each 84-foot length of tube is formed into the wiener sections and collected on the hooks, the machine dwells for a short time. In accordance with one form of the invention, during the dwell time, an elongate supporting member or rod can be moved into the path of the wiener sections, the elongate supporting member being sufficiently long and sturdy to receive and support an entire 84-foot length.

The wieners looped on the supporting member are then carried along a conveyor through an oven in which the wieners are cooked by a known process. The wieners are then chilled, after which they are removed from the elongate member preferably by a stripping device embodying the invention. The wieners are then fed through a peeling machine in which the temporary plastic tube or skin is removed, after which the wieners are packaged and ready for shipment. The elongate supporting members, after being unloaded, return in a continuous path to the wiener-forming machine where they receive another load of the 84-foot linked wiener sections.

The elongate supporting members can move in a manner to carry one length of wieners away from the machine and move the next member into position to receive wieners substantially only when the machine is stationary in the short dwell period. Consequently, if the wiener-forming machine operates 90 percent of the time and dwells 10 percent of the time, the elongate supporting members can move 10 percent of the time and dwell 90 percent of the time. This relatively slow movement of the elongate supporting members enables the overall oven and processing line to be substantially shorter, with a concomitant decrease in investment costs.

In unloading the wieners from the elongate supporting members, a stripping device moves longitudinally of the member and moves the wieners toward the free or outer end of the member and also upwardly off the member to minimize friction or drag of the wiener sections thereon. The elongate members can also be supported so that they slant downwardly at the point where the wieners are removed to further facilitate the unloading.

It is, therefore, a principal object of the invention to provide means for receiving linked wiener sections directly from a high-speed wiener-forming machine and for subsequently processing the wieners.

Another object of the invention is to provide means for loading wiener sections from a wiener-forming machine onto a processing conveyor with a minimum amount of labor.

Still another object of the invention is to provide a simple and effective device for unloading linked wiener sections from an elongate supporting member on a conveyor line.

Yet a further object of the invention is to provide a wiener processing line employing a conveyor which dwells for a substantial period of time whereby the overall length of the processing line can be held to a minimum.

A still further object of the invention is to provide a processing line for wiener sections in which each length of the linked wiener sections is carried on an elongate supporting member which are arranged in parallel relationship, whereby a maximum number of wiener sections can be carried per unit of length of the conveyor.

Many other objects and advantages of the invention will be apparent from the following detailed description of preferred embodiments thereof, reference being made to the accompanying drawings, in which:

FIG. 1 is a schematic plan view of an overall wiener processing line embodying the invention;

FIG. 2 is a somewhat schematic view in perspective of wiener loading apparatus in accordance with the invention;

FIG. 3 is a fragmentary view in perspective on an enlarged scale of the loading apparatus of FIG. 2;

FIG. 4 is a plan view of loading apparatus similar to that shown in FIG. 2;

FIG. 5 is a view in transverse cross section taken along the line 5–5 of FIG. 4;

FIG. 6 is a somewhat schematic plan view of modified loading apparatus;

FIG. 7 is an enlarged view in elevation of a wiener supporting hook constituting part of the apparatus of FIG. 6;

FIG. 8 is a bottom view of the hook of FIG. 7;

FIG. 9 is a schematic view in vertical cross section of a conveyor which can constitute part of the apparatus of FIG. 6;

FIG. 10 is a side view in elevation of an unloading station employing the type of conveyor of FIG. 9; and FIG. 11 is a view in vertical section taken along the line 11–11 of FIG. 10.

Referring particularly to FIG. 1, an overall wiener processing line embodying the invention is indicated at 10 and includes a conveyor 12 which travels in an endless path, driven by a motor M. A high-speed wiener-forming machine 14 prepares the wiener sections to be processed on the line. This machine is capable of producing wiener sections at a much higher rate than machines heretofore known and is commercially available from the Townsend Engineering Company of Des Moines, Iowa under the name of "Frank-a-matic". A section designated 16 of the machine injects the wiener emulsion into the 84-foot length of plastic tube forming the temporary skin for the wieners, and also twists the tube at appropriate intervals to form the individual wiener sections, without the necessity of actually tying the tube at these points as has heretofore been done. As the plastic tube is twisted to form the sections, the sections are ejected into a spiral path and are received on a conveying section designated 18 of the machine 14. The sections are then carried toward the conveyor 12 in a plurality of spiral festoons, with one festoon or spiral loop carried on each hook of the conveyor 18.

The wiener sections are subsequently transferred to the conveyor 12 and transported through an oven designated 20 in which the wieners are cooked by a known process. The oven 20 can include a chill chamber at one end in which the wieners are cooled after cooking and can also include an acid treating chamber at the front end in which acetic acid is applied to the outside of the plastic tube forming the wiener sections. The acid treatment provides a more distinct permanent skin on the wiener sections after the plastic tubing is subsequently peeled off. This treatment is discussed more fully in a co-pending U.S. application of Charles H. Wallace, Ser. No. 657,423. Subsequently, the wiener sections are removed from the conveyor 12 onto an unloading platform 22 after which they are fed by any suitable means to a peeling machine 24 in which the temporary plastic tubing is stripped from the now completed wieners. The conveying line subsequently extends back to the wiener-forming machine 14 where another 84-foot length of the wiener sections is loaded and processed.

Referring now more particularly to the unloading apparatus of FIGS. 2 and 3, the conveying section 18 of the machine 14 includes a continuous conveyor loop 26 of pivotally connected links 28 which carry hangers or hooks 30. The hooks 30 face away from their direction of travel and have end portions bent out of the plane of the conveyor, as shown particularly in FIG. 4. The positioning of the hooks 30 is quite critical in order for them to properly receive the spirally-ejected festoons of wieners from the section 16 of the machine 14.

In an 84-foot length of the plastic tubing, there are about 175 wiener sections with 8 sections carried on each of the hooks 30 so that one of the 84-foot lengths is carried on about 22 of the hooks 30. After one of the 84-foot lengths is loaded onto the conveyor hooks by the machine, which requires approximately 0.32 minutes, the machine dwells for about 0.035 minutes and then begins loading the next series of hooks, with perhaps one or two empty hooks being on the conveyor loop 26 between two series of the loaded hooks. The conveyor section 18 is long enough to carry two complete 84-foot lengths of the wiener sections on the lower run thereof.

In accordance with the invention, to transfer the wiener sections from the conveyor section 18 to the conveyor 12, the conveyor 12 has a plurality of elongate members or rods 32 carried thereby. One of the rods 32 is positioned parallel to the path of the hooks 30 and immediately therebelow, as shown in FIGS. 2 and 3. The rod 32 is moved into the position below the last series of 22 hooks during the dwell period. When the machine operates again and the next series of 22 hooks are being loaded, the hooks and the festoons of the previously loaded series are moved over the rod 32 so that this series or length of wieners is positioned entirely over the rod 32 by the time the next length is completely produced and placed onto the hooks.

While the machine 14 dwells and the conveyor 18 is stationary, the rod 32 moves transversely toward the left and preferably upwardly slightly to carry the festoons of wieners off the hooks 30 and to move another one of the rods 32 into a position immediately below the now empty hooks and parallel to the path thereof to receive the next series of loaded hooks. By the time the machine begins to form and load another 84-foot length of the wiener sections on the hooks, the next rod is in place and ready to receive the previously deposited length of wiener sections from the hooks.

As shown schematically in FIG. 2, the conveyor can have a slight upward portion designated 34 which carries the rod upwardly to facilitate removal of the wiener sections. To further facilitate removal of the festoons from the hooks, the rod 32 can be synchronized to begin movement toward the left or transversely of the wiener hooks before the hooks have completely stopped so that the hooks then travel slightly farther, perhaps 2 inches, after movement of the rod begins. The hooks thereby in effect help to strip themselves from their festoons which are partially supported by the rod. The movement of the conveyor 18 and the section 16 of the machine 14 are preferably mechanically interconnected for proper synchronization. The movement of the main conveyor 12 and the operation of the machine 14 can be synchronized through any suitable electrical timing control designated TC in FIG. 1.

As shown in FIG. 4, the rods 32 can be located at acute angles with respect to their path of movement along the conveyor 12, which further facilitates stripping of the wiener festoons from the hooks 30. Also, with the rods 32 at such angles, the width of the oven 20 and related equipment can correspondingly be reduced. In some instances, the rods 32 and the conveyor 12 can be employed with oven equipment previously used with conveyors carrying wieners by means of inverted T-shaped hangers, as shown in U.S. Pat. No. 3,204,844. In order to support the rod 32 with the overhanging load of wieners, which may be in the order of 17.5 pounds, the rod 32 has a supporting leg 34 (FIGS. 4 and 5) which extends between two conveyor rails 36 and 38, being supported from the first rail 36 by a hanger 40 and a roller 42 and being supported under the rail 38 by a roller 44. The rod 32 is further supported by a transverse bar 46 which is supported by a conveyor chain 48 connecting the hangers 40.

Slightly modified loading apparatus is illustrated in FIGS. 6–8. In this instance, the conveyor section 18 of the machine 14 is modified to enable hooks 50, corresponding to the hooks 30, to pivot relative to the conveyor. Accordingly, the hooks 50 have enlarged heads 52 pivotally supported for movement in a horizontal plane by brackets 54 affixed to conveyor links 56. The hook 50 is urged in a clockwise direction, as viewed from above, by a coiled spring 58 hooked around the lower connecting pin 60 and an upper stop pin 62. The stop pin 62 limits movement of the hook in the clockwise direction by cooperation with a projecting pin 64. When the rod 32 moves transversely of the hooks to strip the wiener sections therefrom, the hooks simply pivot in a counterclockwise direction to enable the wieners to slip off. With this arrangement, no particular relative movement of the conveyor section 18 and the conveyor 12 is necessary nor need the rods 32 be placed at angles to facilitate removal of the wiener sections. The rods 32 thus can extend perpendicularly to a supporting conveyor 66, as shown in FIG. 6.

The conveyor 66 of FIG. 6 can be of the type shown in FIG. 9 which comprises a pair of I-beam rails 68 and 70 with the rod 32 having a connecting bar 72 extending between the rails with a roller 74 under the rail 68 and a roller 76 over the rail 70. The bars 72 can then be connected by links 78 and 80.

The wiener festoons on each of the rods 32 can be unloaded therefrom in any suitable manner. With the conveyor 66, however, the rail 70 can have a depressed section 82 therein, so that when the roller 76 reaches this section, the free end of the rod 32 will drop to facilitate removal of the wieners. The angle of the rod 32 can be sufficient to enable the wieners to drop therefrom by gravity. As shown, however, unloading can be effected by means of a tapered pusher 84 which is moved outwardly along the rod 32 by a hydraulic cylinder 86. As the pusher 84 moves outwardly, it picks up the festoons of wieners and raises them off the rod 32 to reduce the drag on the rod. The wieners are then simply piled on the unloading platform 22 after which they are unpeeled by the machine 24.

It will be seen from the above that the invention provides a simple but yet most effective means for loading wiener sections onto a processing line from a high-speed wiener-forming machine, and further provides a simple means for unloading the wieners therefrom after processing.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. In apparatus for handling wieners which comprises a machine for forming a plurality of wiener sections, which are connected together in end-to-end relationship in a generally predetermined length, said machine ejecting said wiener sections in a generally spiral pattern, and a conveyor comprising a plurality of hooks and means for moving said hooks in a predetermined path relative to said machine to receive said wiener sections therefrom in a plurality of festoons which form a generally flattened spiral configuration on the hooks, said hooks being movable along the path in a direction opposite to that in which the hooks point, the improvement comprising a plurality of elongate members, and means for sequentially moving said elongate members into a position generally parallel to the path of the hooks to receive the length of wiener sections on said hooks and for subsequently moving said elongate members and wiener sections away from the hooks.

2. Apparatus according to claim 1 characterized by means for removing the wiener sections from said elongate member comprising a wiener-engaging member, and means for moving said member along said elongate member to engage the wiener sections thereon and push them off an end of the elongate member.

3. Apparatus according to claim 2 wherein said wiener-engaging member has a slanted surface for pushing and raising the wiener sections relative to said elongate member.

4. Apparatus according to claim 1 characterized by means for tilting the loaded elongate members in downward directions to facilitate unloading the processed wiener sections therefrom.

5. Apparatus according to claim 1 characterized by said moving means for said elongate members causing said members to move away from the hooks while said hooks are still moving along said path to facilitate removal of the wiener sections from said hooks.

6. Apparatus for handling wieners comprising a conveyor having a plurality of hangers and means for carrying said hangers in a predetermined path, said conveyor having a length sufficient to carry two separate lengths of wiener sections in festoons, a main conveyor positioned transversely to the path of said hangers, said main conveyor having a plurality of elongate, parallel members supported thereby with said elongate members being positioned parallel to the path of the hangers and of a length sufficient to receive one of the lengths of wiener sections on each of said members.